July 8, 1952 F. D. RINGLER ET AL 2,602,351
SAFETY HANDLE
Filed July 18, 1951
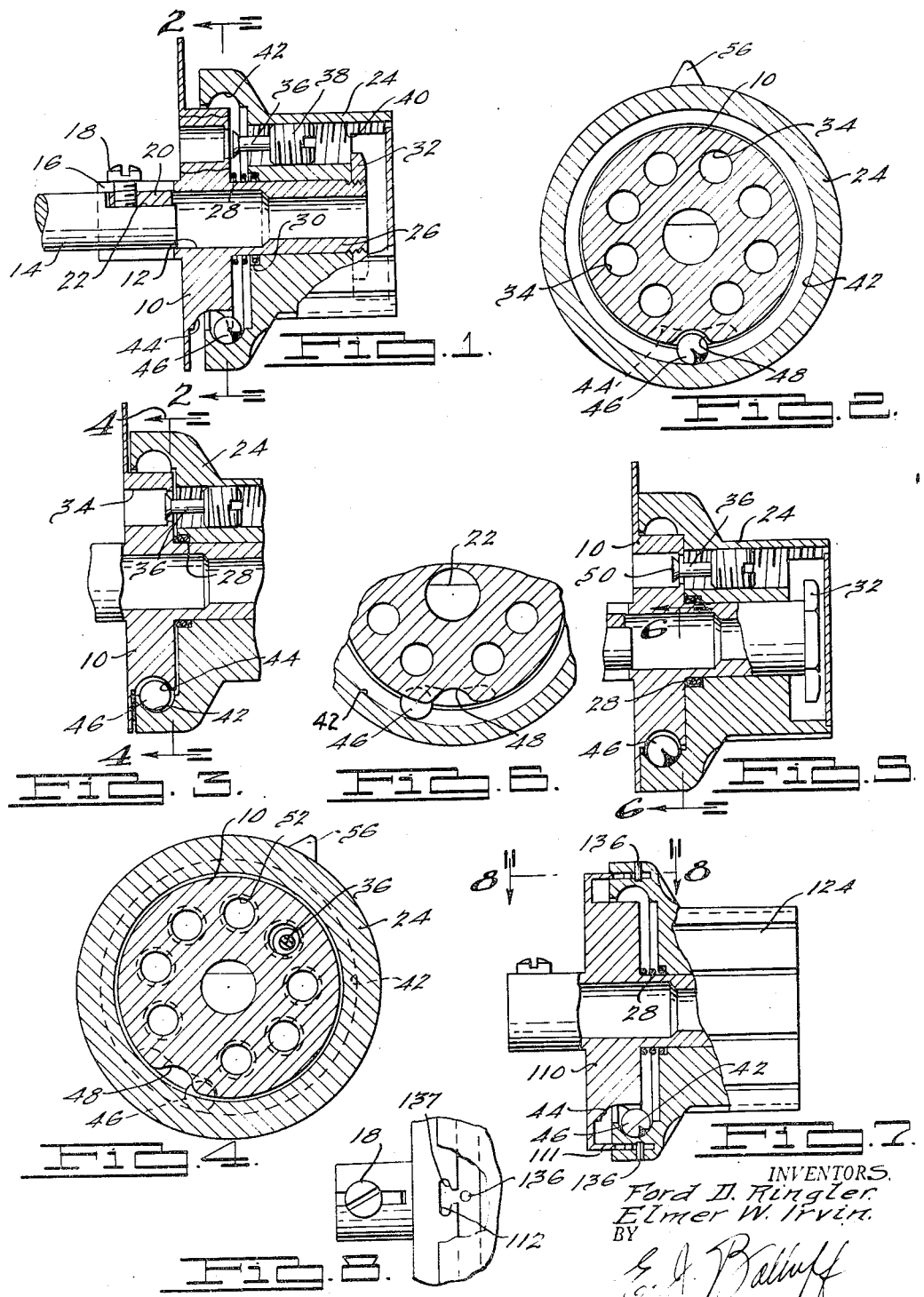
INVENTORS.
Ford D. Ringler
Elmer W. Irvin
BY
G. J. Balluff
ATTORNEY Patented July 8, 1952

2,602,351

UNITED STATES PATENT OFFICE 2,602,351

SAFETY HANDLE

Ford D. Ringler, Flat Rock, and Elmer W. Irvin, Detroit, Mich.

Application July 18, 1951, Serial No. 237,408

8 Claims. (Cl. 74—548)

This invention relates to safety handles for gas cocks and controls in order to prevent the accidental or undesired operation thereof. Considerable difficulty is often experienced in trying to prevent young children from opening the gas cocks of gas stoves, and while various suggestions have been made heretofore to obviate this difficulty, none of them have, so far as we know, gone into general or extensive use. This invention contemplates a safety handle in which the exposed member is freely rotatable so that any rotation thereof will not open the gas cock. The safety handle embodying our invention includes provisions whereby upon axial shifting of such handle against the force of a spring, the handle will be locked to the operating member of the gas cock for rotation therewith.

A principal object of the invention, therefore, is to provide a novel and efficient safety handle for gas cocks and the like.

Another object of the invention is to provide a safety handle which is adapted to accommodate valve stems of different lengths and with the flat on the top or bottom thereof.

Another object of the invention is to provide a safety handle in which the exposed portion is normally freely rotatable.

Another object of the invention is to provide a safety handle in which the exposed operating member is maintained in a locked position relative to the valve stem when the handle is rotated out of its normal position.

Other and further objects of the invention will be apparent from the following description and claims and may be understood by reference to the accompanying drawing, of which there is one sheet, which by way of illustration shows preferred embodiments of the invention and what we now consider to be the best mode in which we have contemplated applying the principles of our invention. Other embodiments of the invention may be used without departing from the scope of the present invention as set forth in the appended claims.

In the drawings:

Fig. 1 is a vertical sectional view of a safety handle embodying our invention and shown in the released or normal position thereof;

Fig. 2 is a sectional view taken along the line 2—2 of Fig. 1;

Fig. 3 is a view similar to Fig. 1 and showing the relationship of the parts after the safety handle has been manipulated to open the gas cock;

Fig. 4 is a sectional view similar to Fig. 2 but taken along the line 4—4 of Fig. 3;

Fig. 5 is another view similar to Fig. 1 but showing the relationship of the parts when the safety handle is being returned to its normal position;

Fig. 6 is a sectional view taken along the line 6—6 of Fig. 5;

Fig. 7 is a view similar to Fig. 1 but showing a modified form of the invention; and Fig. 8 is a fragmentary sectional view taken along the line 8—8 of Fig. 7.

Referring now to Figs. 1 and 2, it will be seen that a safety handle embodying our invention comprises in general a rotary body 10 provided with a socket 12 for receiving the stem 14 of a gas cock or other control. A projecting portion of the socket is slotted as indicated at 16 to accommodate the screw 18 which is threadedly secured to a member 20 adapted to seat on the flat 22 of the stem 14 for securing the safety handle to the stem 14.

The safety handle further includes a cup-shaped handle 24 which substantially encloses the body 10 and is mounted on a shaft 26 shown as being made integral with the body 10 and projecting axially therefrom. A spring 28 surrounding the shaft 26 and confined between the body 10 and a shoulder 30 on the handle 24 biases the handle 24 and the body member 10 axially away from each other, a nut 32 threadedly secured on the threaded end of the shaft 26 limiting the separating movement of the handle 24 relative to the body 10.

The body 10 is provided with a series of axially extending holes or abutments 34. A pin 36 projecting from a threaded plug 38 projects toward the abutments 34 but is separated therefrom in the released position of the handle as shown in Fig. 1. The plug 38 is threaded in a threaded hole 40 in the handle 24. The handle 24 is axially shiftable toward the body 10 to the position as illustrated in Fig. 3 in which the end of the pin 36 is projecting into one of the holes 34, and in this position it will be obvious that rotation of the handle 24 will rotate the body 10 since the portions of the body 10 defining the holes 34 lie in the path of movement of the pin 36. Thus, the handle 24 and the body 10 are locked against rotation relative to each other so that upon rotation of the handle 24 the body 10 will rotate therewith and thereby rotate the stem 14 of the gas cock in order to open or close the same, depending upon the direction of rotation of the handle 24. As shown in Fig. 1, however, the handle 24 is freely rotatable relative to the body 10, and in order to couple the same for rotation together it is only necessary to axially move the handle toward the body 10 until the pin 36 projects into one of the holes 34, whereupon the body 10 will rotate with the handle 24.

Means are provided to maintain the handle 24 in its locked position relative to the body 10 when the handle and the body are rotated out of their normal positions, that is, rotated to a position to open the gas cock, and such means comprise an annular groove 42 in the handle 24 and a relatively short, circumferentially extending groove 44 in the body 10, the grooves normally being out of alignment as shown in Fig. 1. However, upon axial movement of the handle 24 toward the body 10 the grooves will be aligned as shown in Figs. 3 and 5.

A ball 46 partially disposed in the groove 42 is normally accommodated in a notch 48 formed in one wall of the groove 44 in the body 10 when the handle 24 is in its normal position as shown in Fig. 1. However, upon movement of the handle 24 to the position shown in Fig. 3, that is, to its locked position, the grooves 42 and 44 will be aligned, and upon rotation of the handle 24 and the body 10 the ball 46 will, under the influence of gravity, tend to stay in its lowest possible position whereby the ball 46 will move out of alignment with the notch 48, as shown in Figs. 3 and 4, and thereby function to maintain the handle 24 and the body 10 in their locked positions; or otherwise stated, the ball 46 will thus prevent axial movement of the handle 24 away from the body 10. Thus, when the gas cock is open the handle 24 will be positively coupled to the shaft 14 for rotation therewith in both directions.

Upon returning the handle 24 and the body 10 to their normal position, that is, the closed position of the gas cock, the notch 48 will be returned to its lowermost position as shown in Fig. 6, but the spring 28 reacting on the handle 24 and the body 10 will function to hold the ball 46 clamped between the walls of the grooves 42 and 44 as shown in Fig. 3 until released, and to this end we have provided a frusto-conical head 50 on the pin 36 which is engageable with an annular rim or flange 52 projecting inwardly from the side walls of the holes or apertures 34 at one end thereof. As the handle 24 is rotated back toward its normal position, the tapered sides of the head 50 will engage the edge of the rim or flange 52 and pull the handle 24 axially toward the body 10, thereby releasing the ball 46 from the pressure with which it is held between opposite sides of the grooves 42 and 44 by the spring 28 and permitting the ball 46 to return to its lowermost position opposite the notch 48, whereby upon release of the handle 24 the spring 28 will be operative to restore the parts to their normal position as shown in Fig. 1. The groove 44 extends a short distance to both sides of the notch 48 so that regardless of the direction in which the stem 14 turns to open the gas cock from its normal position the same mode of operation of the safety handle will obtain.

The body 10 is provided with an index finger 56 which when positioned as illustrated in Fig. 2 indicates the normal or closed position of the gas cock.

In the modification illustrated in Figs. 7 and 8, instead of using the holes 34 and the pin 36, the body member 110, a counterpart of the body 10, is provided with an axially extending peripheral flange 111 which is provided with a series of slots 112, one of which is shown in Fig. 8. The flange 111 extends into an annular groove in the handle 124. The handle 124 is provided with a series of radially extending pins 136 which when the safety handle is in the position as shown in Figs. 7 and 8 lie outside of the slots 112 so that the handle 124 at such time is free to rotate relative to the body member 110. However, upon axial movement of the handle 124 toward the body member 110 and against the force of the spring 28, the pins 136 may be projected into the slots 112 so as to cause the body member 110 to rotate with the handle 124. While two pins 136 are shown, one or more may be employed. The slots 112 are T-shaped and provided with ramps 137 which cooperate with the pins 136 upon rotation of the handle 124 in either direction to draw the handle 124 toward the body member 110 so that the ball 46 will be free to seek its lowermost position in the grooves 42 and 44 as previously described.

When the handle 124 is released, the spring 28 will cause the sides of the groove to hold the ball 46 in the manner shown in Fig. 3, but during the turning movement of the handle 24 when it is coupled with the body member 110, the camming action of the ramps 137 on the pin 136 will hold the handle 124 relative to the body 110 so that the ball 46 will be free to seek its lowermost position. Because of this, the ball 46 will function to maintain the handle 124 in its locked position with the body member 110 when the handle and body are out of their normal position, and will also permit the separating movement of the handle 124 and the body 110 when such parts are returned to their normal position.

While we have illustrated and described preferred embodiments of our invention, it is understood that these are capable of modification and we therefore do not wish to be limited to the precise details set forth but desire to avail ourselves of such changes and alterations as fall within the purview of the following claims.

We claim:

1. A safety handle for controls having an operating stem, comprising a rotary body having a socket in one face thereof for receiving said stem and an axially projecting shaft, a cup shaped handle substantially enclosing said body and mounted on said shaft for rotational and axial movement relative to said body, a spring reacting on said body and handle for biasing said handle and body axially to one position relative to each other, said body member being provided with a series of abutments and said handle being provided with a member projecting toward said abutments but separated therefrom in said one position of said handle and body, said handle being axially shiftable to another position relative to said body and when in said other position said member being engageable with one of said abutments for locking said member and handle against rotation relative to each other, said handle and body being provided with annularly extending grooves which are out of alignment in said one position of said handle and body and which in said other position of said handle and body are aligned with one groove surrounding the other and with the grooves presented toward each other, a ball in the outer groove, one wall of the inner groove having a notch for accommodating said ball when said handle and body are in said one position, and said outer groove being continuous so that in such one position of said handle and body said ball is free to run in said outer groove upon rotation of said handle relative to said body, said inner groove being of limited extent, said ball being operative in said other position of said handle and body upon rotation thereof together from their normal position to lock the same against axial movement relative to each other which would move said member and the abutment engaged thereby out of locking relation.

2. A safety handle for controls having an operating stem, comprising a body having a socket in one face thereof for receiving said stem and an axially projecting shaft, a handle mounted on said shaft for rotational and axial movement relative thereto, a spring reacting on said body and handle for biasing said handle and body axially to one position relative to each other, said body member being provided with a series of abutments and said handle being provided with a member projecting toward said abutments but separated therefrom in said one position of said handle and body, said handle being axially shiftable to another position relative to said body and when in said other position said member being engageable with one of said abutments for locking said member and handle against rotation relative to each other, said handle and body being provided with annularly extending grooves which are out of alignment in said one position of said handle and body and which in said other position of said handle and body are aligned with one groove surrounding the other and with the grooves presented toward each other, a ball in the outer groove, one wall of the inner groove having a notch for accommodating said ball when said handle and body are in said one position, said outer groove being continuous so that in said one position of said handle and body said ball is free to run therein upon rotation of said handle relative to said body, said ball being operative in said other position of said handle and body upon rotation thereof together from their normal position to lock the same against axial movement relative to each other which would move said member and the abutment engaged thereby out of locking relation.

3. A safety handle according to claim 2 wherein said abutments comprise a series of axially extending holes in said body and said member comprises an axially extending pin.

4. A safety handle according to claim 2 wherein said abutments comprise a series of slots formed in an axially extending flange on said body and said member comprises a pin carried by said handle.

5. A safety handle according to claim 2 wherein said abutments and member are provided with cooperative camming surfaces operable upon return rotation of said handle and body to their normal position to release said ball from the pressure exerted thereon due to said spring so as to permit said ball to return to its normal position at the lowermost portion of said outer groove under the influence of gravity.

6. A safety handle for controls having an operating stem, comprising a body having a socket in one face thereof for receiving said stem, a cup shaped handle substantially enclosing said body and mounted thereon for rotational and axial movement relative thereto, a spring reacting on said body and handle for biasing said handle and body axially to one position relative to each other, said body member being provided with a series of abutments and said handle being provided with a member projecting toward said abutments but separated therefrom in said one position of said handle and body, said handle being axially shiftable to another position relative to said body and when in said other position said member being engageable with one of said abutments for locking said member and handle against rotation relative to each other, said handle and body being provided with annularly extending grooves which are out of alignment in said one position of said handle and body and which in said other position of said handle and body are aligned with one groove surrounding the other and with the grooves presented toward each other, a ball in the outer groove, one wall of the inner groove having a notch for accommodating said ball when said handle and body are in said one position, said outer groove being continuous so that said ball is free to run therein upon rotation of said handle relative to said body, said ball being operative in said other position of said handle and body upon rotation thereof together from their normal position to lock the same against axial movement relative to each other which would move said member and the abutment engaged thereby out of locking relation.

7. A safety handle for gas cocks and the like comprising a body member having provision by means of which it may be secured to the operating member of such gas cock, a handle shiftable axially relative to said body member and rotatably mounted thereon and substantially enclosing said body member, means biasing said handle to one position relative to said body member in which said handle is freely rotatable relative to said body member, locking means operative in another position of said handle relative to said body member for locking said handle against rotation relative to said body member, said handle and body member being constructed and arranged so that said handle is freely shiftable from said one position to said other position in any rotary position of said handle relative to said body member, and means operative for maintaining said handle in its locked position relative to said body member when said handle and body member are rotated out of their normal position.

8. A safety handle for gas cocks and the like comprising a body member having provision by means of which it may be secured to the operating member of such gas cock, a handle shiftable axially relative to said body member and rotatably mounted thereon and substantially enclosing said body member, said handle being biased to one position relative to said body member in which said handle is freely rotatable relative to said body member, locking means operative in another position of said handle relative to said body member for locking said handle to said body member for rotation therewith, and means operative for maintaining said handle in its locked position relative to said body member when said handle and body member are rotated out of their normal position, said last mentioned means being automatically releasable upon return of said handle and body member to its normal position and comprising cooperating grooves in said body member and handle and a ball member in said grooves.

FORD D. RINGLER.
ELMER W. IRVIN.

REFERENCES CITED

The following references are of record in the file of this patent:

UNITED STATES PATENTS

| Number | Name | Date |
| --- | --- | --- |
| 814,301 | Kunz | Mar. 6, 1906 |
| 1,013,878 | Hilton | Jan. 9, 1912 |
| 1,121,282 | Parker | Dec. 15, 1914 |
| 1,162,935 | Lange | Dec. 7, 1915 |
| 2,501,008 | Schramm | Mar. 21, 1950 |